US008074538B2

(12) United States Patent
Gilgallon et al.

(10) Patent No.: US 8,074,538 B2
(45) Date of Patent: Dec. 13, 2011

(54) APPARATUS FOR USE IN AND METHOD OF SETTING THE TENSION IN A DRIVE BELT OF A MOTORCYCLE

(76) Inventors: John Gilgallon, Commerce, MI (US); George Faleris vice Saleris, St. Ignace, MI (US)

( * ) Notice: Subject to any disclaimer, the term of this patent is extended or adjusted under 35 U.S.C. 154(b) by 210 days.

(21) Appl. No.: 12/481,853

(22) Filed: Jun. 10, 2009

(65) Prior Publication Data

US 2009/0241742 A1 Oct. 1, 2009

Related U.S. Application Data

(63) Continuation-in-part of application No. 12/012,250, filed on Feb. 1, 2008, now abandoned.

(60) Provisional application No. 60/899,188, filed on Feb. 2, 2007.

(51) Int. Cl.
*B25B 13/00* (2006.01)
*F16H 7/14* (2006.01)

(52) U.S. Cl. ......... 81/57.29; 474/116; 81/484; 81/121.1

(58) Field of Classification Search ................. 81/57.29, 81/484, 57.26, 121.1, 462, 185.2, 13, 177.1; 474/116, 101

See application file for complete search history.

(56) References Cited

U.S. PATENT DOCUMENTS

| | | | | | |
|---|---|---|---|---|---|
| 974,573 | A | * | 11/1910 | Kindermans | 474/116 |
| 3,272,037 | A | * | 9/1966 | Bruehl | 81/57.29 |
| 4,237,744 | A | * | 12/1980 | Jolly | 474/116 |
| 5,954,466 | A | * | 9/1999 | Coffey et al. | 81/13 |
| 6,799,491 | B2 | * | 10/2004 | Crowley | 81/3.55 |
| 7,052,422 | B2 | * | 5/2006 | Skidmore et al. | 474/116 |

* cited by examiner

*Primary Examiner* — Hadi Shakeri

(74) *Attorney, Agent, or Firm* — The Weintraub Group, P.L.C.

(57) ABSTRACT

A specially configured wrench is fitted to the fork structure of the rear wheel of a motorcycle to transmit rotational torque to the axle and move the rear wheel axle and sprocket to adjust and accurately set the tension in the drive belt of the motorcycle to a desired level. Further, a method is disclosed for reducing slack, changing, and/or setting a desired tension in the flexible power transmission mechanism of a motorcycle, the mechanism exemplified by a chain or drive belt having upper and lower reaches wrapped about respective of a rotatable forward motor drive sprocket and a rotatable rear wheel drive sprocket and used in cooperation with a fork structure for mounting the rear wheel and a cam-operated structure for repositioning the rear sprocket and associated axle.

10 Claims, 3 Drawing Sheets

FIG 1- Prior Art
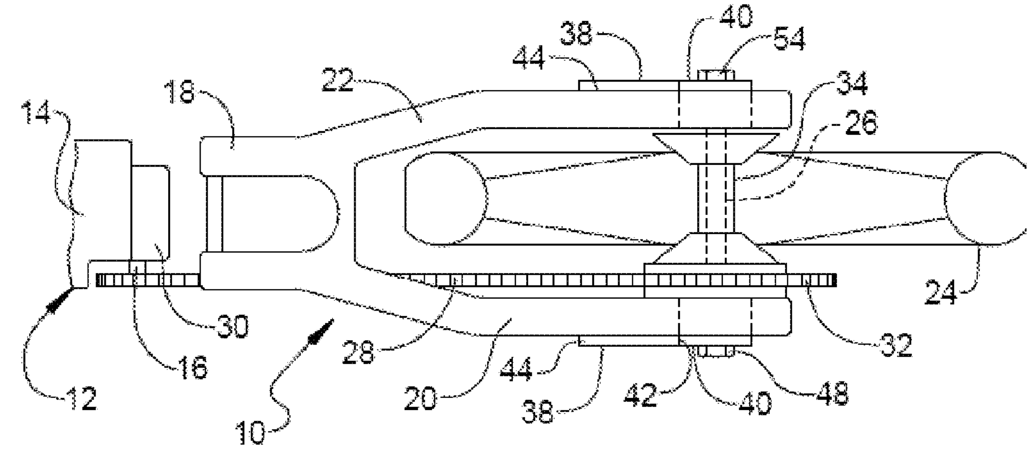
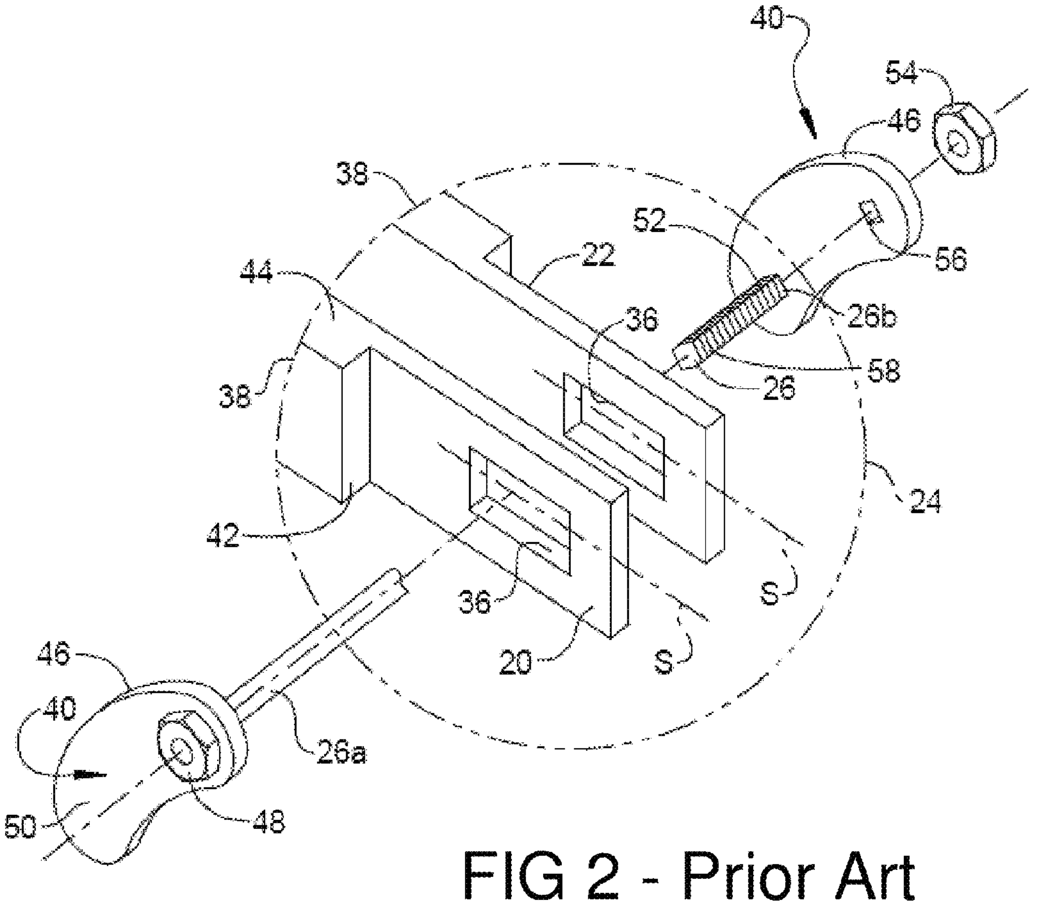
FIG 2 - Prior Art

FIG 3
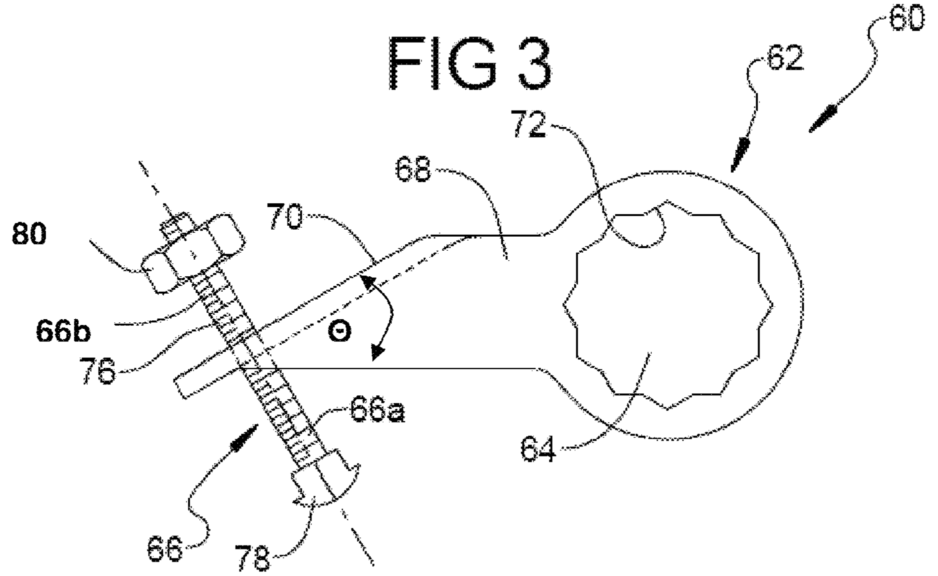
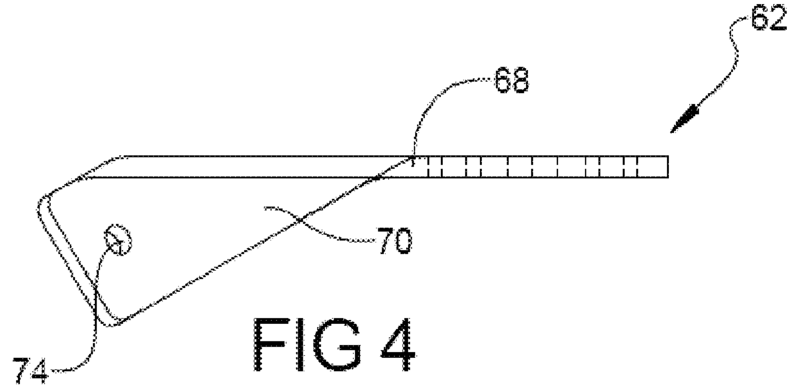
FIG 4
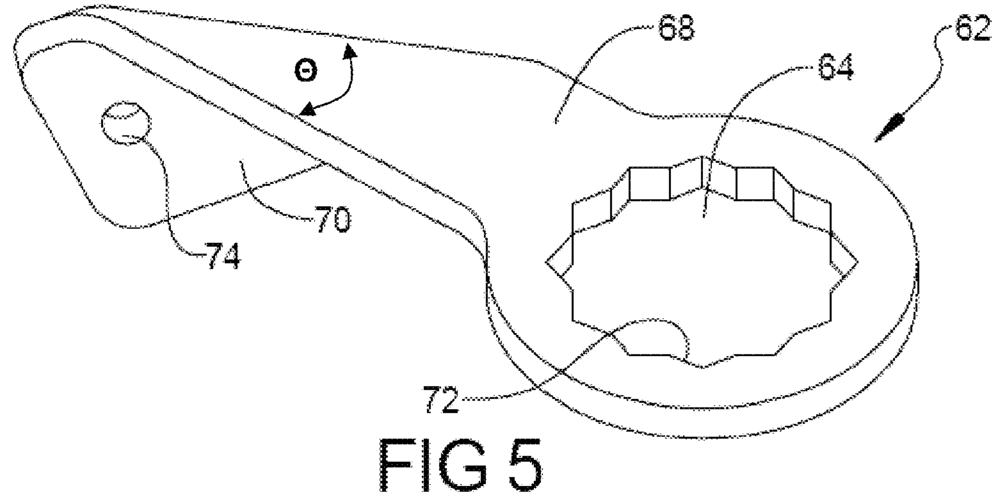
FIG 5

FIG 6
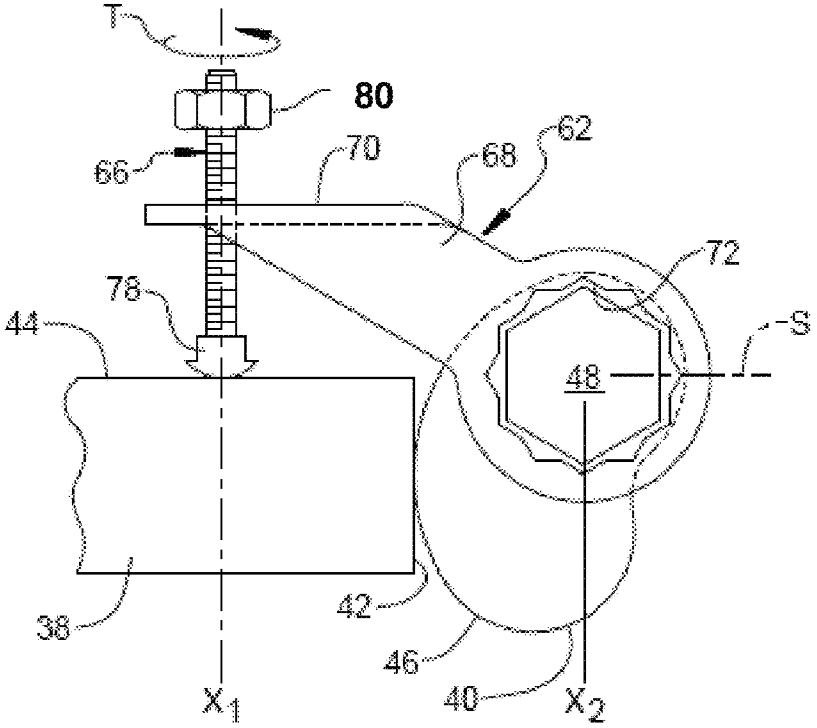
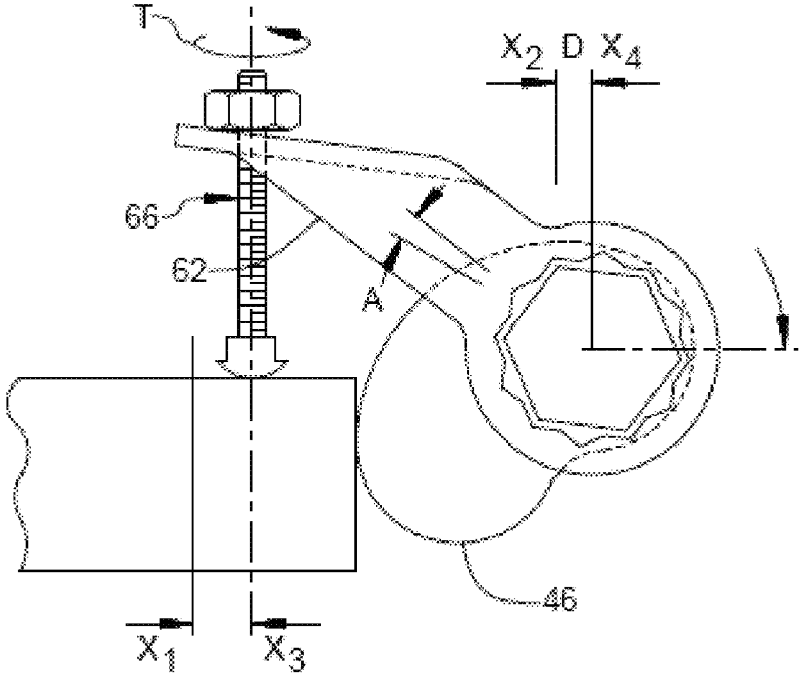
FIG 7

APPARATUS FOR USE IN AND METHOD OF SETTING THE TENSION IN A DRIVE BELT OF A MOTORCYCLE

CROSS-REFERENCE TO RELATED APPLICATION

This application is a continuation-in-part of application Ser. No. 12/012,250, filed Feb. 1, 2008, now abandoned which claims the benefit of provisional Application No. 60/899,188, filed Feb. 2, 2007, the entire disclosure of which is incorporated herein.

BACKGROUND OF THE INVENTION

1. Field of the Invention

The present invention pertains to motorcycles with a flexible power transmission mechanism, such as a chain or drive belt, and having cam operated structure for changing the tension in such mechanism, and more particularly, this invention relates to an apparatus and method for use in adjusting the cam operated mechanism to accurately set the tension in the drive belt of the motorcycle having such mechanism.

2. Description of the Prior Art

Wheeled vehicles such as motorcycles generally have a drive sprocket or pulley attached to the drive shaft of the motor. The drive sprocket or pulley is then coupled to a flexible power transmission mechanism. In the case of the drive sprocket, the flexible power transmission mechanism is a chain. Alternatively, in the case of the drive pulley, the flexible power transmission mechanism is a belt.

The chain or belt is coupled to a sprocket or pulley affixed to a driven wheel. The driven wheel is mounted to an axle that is secured to the frame of the motorcycle. Generally the frame of the motorcycle has a forked swing arm and the axle is secured to the swing arm. The swing arm allows bounce, or vertical movement, of the driven wheel. This vertical movement is dampened by a shock absorbing system connecting the swing arm and a rigid portion of the frame.

As is known in the art, the chain or belt must have correct tension to efficiently transfer power from the motor to the driven wheel. Accordingly, chain or belt-tensioning devices have been proposed. Such devices are used to adjust for the natural stretch of the chain. When power is provided or eliminated to the drive sprocket, die chain may be taut on the top or bottom. Particularly in motorcycle chain drives, vibration occurs in normal operation, resulting in a loss of power transfer.

Some motorcycle manufacturers, such as those manufactured by Yamaha Motor Corporation, USA, Kawasaki Motors Corp., USA, American Suzuki Motor Corporation, Ducati Motor Holding S. p. A., integrate a chain tensioner or puller with the driven wheel of their motorcycles. The chain tensioner is coupled to the forks of the swing arm and is placed in a recessed axle slot of the forks. The chain tensioner is attached to the axle of the driven wheel.

In another known tension adjusting device, two tension adjusters are provided and joined to each side of the axle member that engages a guide recess of the forks of the frame member. A threaded adjustment stud in each tension adjuster contacts a respective fork to move the axle member in an adjustment slot to adjust the tension of the chain. In operation, separately adjusting the two studs independently of one another may result in the opposite sides of the shaft being pulled differently and the tension in the chain being other than expected.

In many of the current models of motorcycle, such as those manufactured by Harley-Davidson, a chain or belt tensioner includes two cams, and two guide plates, the cams being joined to the opposite ends of the driven shaft, and the guide plates being joined to the opposite sides of the motorcycle frame and forward of the driven axle. The belt tension is adjusted by rotating a first hex head fixedly joined to one cam, wherein both cams are simultaneously rotated and their respective cam surfaces progressively engaged with their respective guide plates. This rotation pushes the driven axle within an axle bore that is opened within the recessed guide of the forks. Thereafter, a second hex head on the other end of the drive shaft is threadably advanced towards the frame and to drive the cams into gripping engagement with the forks.

However, in operation, the mechanic must hold the first hex head stationary, while rotating the second hex head. As a result, torque placed on the driven shaft by the second hex head being secured thereto may cause the first head to rotate by a small amount. This will result in a back off (i.e., move the shaft back), thus changing the desired tension that was set.

It is to be appreciated that there is a need for a tensioning arrangement that ensures that the tension that is set in the belt during tensioning remains the tension in the belt following tensioning.

SUMMARY OF THE INVENTION

An object of this invention is the provision of a tension-adjusting device that adjusts the tension of a flexible power transmission mechanism for conventional wheeled vehicles such as a motorcycle.

Another object is the provision of a method by which an after market purchaser may adjust the tension of a motorcycle drive belt of a conventional motorcycle using a simple tension adjustment socket wrench according to this invention.

Another object of the invention is to provide a novel adjusting device in the nature of a socket wrench which is of simple construction, inexpensive, can be easily manufactured, and rapidly used as an aid in the adjusting the belt tension of a motorcycle drive system.

Another object of this invention is the provision of a socket wrench for positioning and immobilization of an eccentric camshaft and thereby set the tension in the drive belt operably connected to the camshaft.

Another object of the invention is the provision of a torque transmitting wrench for use with standard elements of a conventional motorcycle and in setting the belt tension thereof, the wrench including a lever connectible to the axle that supports the rear wheel of the motorcycle, the axle operably connected to the drive belt via a rear sprocket, and an actuator rod atop a motorcycle bracket, the rod vertically positionable relative thereto wherein to rotate the lever, move the driven shaft rearwardly and increase the belt tension and immobilize the shaft, and then securing the drive belt in place, whereupon the wrench is removed and the belt tension achieved.

Another object of this invention is to provide a tension adjusting device that is used in combination with and attached to the axle member of the driven wheel of a motorcycle and coupled to a frame member associated with the drive wheel whereby to adjust tension of a flexible power transmission mechanism that transfers power from the drive shaft to the driven shaft of the motorcycle To accomplish at least one of these objects, there is provided a wrench for setting the tension for a drive belt of a motorcycle, the drive belt mounted to a frame of the motorcycle by a drive shaft and a driven shaft, the wrench comprising:

an elongated lever having first and second end portions at right angles to one another, the first end portion including means for engaging and rotating one end of the driven shaft, the second end portion including a flange, and an actuator connected to the flange for movement transverse thereto, the actuator having a distal end portion for engaging the frame wherein relative movement between the actuator and flange member causes the lever to rotate and the driven shaft to rotate from a first position into a second position wherein the shaft is immobilized by the wrench and the drive belt is in a desired tension.

In a preferred embodiment, the driven shaft is provided with a hex shaped nut, and the means for engaging and rotating is in the form of a generally circular opening the wall of which has gripping surfaces to engage the nut.

In accomplishment of another object, there is provided a motorcycle belt torque transmitting wrench of the type having an elongated lever including first and second end portions disposed at a right angle to one another, the right angle between the first and second end portions being offset along an offset included angle θ, θ being less than 90 degrees, the first end portion having an opening configured to receive a first nut, and the second end portion including a flange, wherein the improvement comprises:

the opening having a closed end and being generally circular in shape, the opening further having at least six gripping surfaces to engage the first nut;

a threaded actuator threadably connected to the flange for movement transverse thereto, the threaded actuator having a non-abrasive foot secured to a distal end portion of the threaded actuator for engaging a surface, and a proximal end portion of the threaded actuator having a second nut fixedly secured thereto; and the flange having a threaded hole configured to receive the threaded actuator, wherein rotational movement of the actuator rotates the wrench about the first nut.

In accomplishment of another object, there is provided a method of adjusting and setting a desired tension in a drive belt of a motorcycle of the type including a frame having a first and second forks and associated guide brackets, a driven shaft having first and second ends, respectively, connected to the first and second forks, each end of the shaft having an eccentric cam that engages a respective guide bracket upon rotation of the driven shaft, the first cam having an engagement nut fixed thereto and the second cam being connected to the second end of the shaft by a second engagement nut, and a drive belt operably associated, in part, in driving relation with the driven shaft, the steps of the method comprising:

providing a socket wrench, the socket wrench including an elongated lever having first and second end portions, the end portions being at right angles to one another with the first end portion including a socket for engaging and rotating the first engagement nut and the second end portion including an actuator connected for movement relative to the lever, the actuator having an upper end portion and a lower end portion, the lower end portion for engaging the first guide bracket wherein relative movement between the actuator and lever causes the lever to rotate about the first and second engagement nuts, positioning the socket about the first engagement nut and the lower end portion of the actuator atop the first guide bracket, rotating the threaded actuator such that the lever, the first engagement nut, and the driven shaft rotate in a direction causing both cams to rotate and engage their respective guide brackets and push the driven shaft away from the guide brackets and into a position wherein the drive belt has a desired tension, tightening the second engagement nut about the second end of the driven shaft such that the second engagement nut presses the second cam towards and against the second fork, with progressive tightening causing both of the cams to be clamped against their respective forks and the driven shaft to be locked in the position wherein the drive belt has the tension maintained, whereupon the wrench is removed.

Desirably, in effecting the tensioning herein, the tension adjusting device, or wrench, may be used in a confined area with limited turning space. Preferably, the central socket is 12-point (double-hexagonal) configuration, in part because the 12-point socket doubles the number of starting positions. However, the socket could be at least 6-point (hexagonal), or of other configuration other than hexagonal, depending on the nut used on the motorcycle.

The actuator desirably extends through a complementary threaded hole in the second end portion of the socket wrench, the upper end portion of the actuator having a hexagonal drive nut fixedly attached thereto and a foot fixedly attached to the lower end portion of the actuator.

In addition, the first engagement nut is preferably hexagonal in shape, and the socket is hexagonal in shape and dimensioned for close fitment about the engagement nut.

In yet another embodiment according to this invention, there is provided a wrench for tensioning a drive belt of a motorcycle of the type including a support frame having a motor and a fork assembly for mounting a rear wheel, a drive shaft, connected to the motor, and a driven shaft having first and second ends connected to opposite sides of the fork assembly, the first and second ends each including, respectively, a cam and a hexagonal shaped head, the fork assembly having first and second guide members, the drive belt associated in operable driving relation with the shafts, and rotation of the first hex head causes the cam to engage the first cam guide and push, the shaft away therefrom, comprising:

an elongated lever having a shaped opening therethrough, the opening formed by a succession of gripping surfaces that are complementary to the hexagonal shaped heads and adapted to allow passage of the first hex head therethrough in a manner that die gripping surfaces are juxtaposed in close gripping relation with, corresponding sidewalls of the hex head, and an elongated actuator rod having lower, upper and medial portions, the medial portion threadably connected to the lever, the lower portion adapted to engage the first guide member, and the upper portion positioned for rotational engagement, such that, relative rotation between the lever and actuator rod causes the lever to rotate the cam against the first guide member and push the driven shaft away from the guide and increase the tension in the drive belt, the lever and rod operating to immobilize the driven shaft in the position for tightening the hex heads into clamped relation with the fork assembly.

The present invention will be more clearly understood with reference to the accompanying drawings and to the following Detailed Description, in which like reference numerals refer to like parts and where:

BRIEF DESCRIPTION OF THE DRAWINGS

FIG. 1 is a plan view of the rear drive wheel section of a conventional prior art motorcycle including a flexible power transmission drive belt or chain extending between the rear wheel and the drive motor;

FIG. 2 is a simplified exploded perspective view of the rear drive wheel section of FIG. 1 with portions removed to illustrate elements for tensioning the drive belt;

FIG. 3 is a side view of a socket wrench according to this invention for use in ensuring that a desired tension is set and maintained when adjusting the tension in the drive belt of the rear wheel section in the motorcycle shown in FIG. 1, the socket wrench including a lever bracket with a socket and a vertically adjustable actuator rod to apply rotational torque to the lever bracket;

FIGS. 4 and 5 are perspective views of the lever bracket shown in FIG. 3 without the actuator rod; and FIGS. 6 and 7 are partial side elevation views showing the method of tensioning the drive belt in the motorcycle of FIG. 1 using the socket wrench according to this invention.

DETAILED DESCRIPTION OF PREFERRED EMBODIMENTS

Turning now to the drawings, FIG. 1 illustrates part of a conventional prior art motorcycle 10 that includes a frame 12 and an engine/transmission assembly 14 connected to the frame 12. The engine/transmission assembly 14 includes an engine and a transmission connected to the engine. The engine and the transmission of the engine/transmission assembly 14 could either include a single integral housing or separate housings connected together. The transmission includes an output or drive shaft 16 that is rotated in response to operation of the engine. While not shown, the motorcycle 10 also includes a steering assembly and a front wheel rotatably mounted to the steering assembly.

A rear frame or swing frame member 18 is pivotably mounted to the frame 12 and includes a wheel mounting fork structure formed by a pair of brackets or fork members 20 and 22 that are axially extending, laterally spaced, and form a U-shaped recess for mounting the rear wheel 24 of the motorcycle therebetween. A rear axle or wheel shaft 26 extends between the fork members or brackets 20 and 22 to mount the wheel 24 in the recess and connect the axle to the forks. Each fork 20 and 22 has a horizontally extending guide slot 36 to receive an opposite respective end portion 26*a* and 26*b* of the axle or wheel shaft 26. A flexible power transmission dive chain or belt 28 having an upper and lower reach is wrapped about a rotatable motor drive sprocket 30, attached to the drive shaft 16 of the motor, and a rotatable rear wheel or driven sprocket 32.

A chain or belt tensioning arrangement to control and/or adjust the slack and/or tension in the upper and lower reaches of the drive chain or belt is provided. The tensioning arrangement includes the distal end of each fork 20 and 22 including a cam receiver or cam guide 38 and a cam 40. The cam guide 38 includes a vertical end face 42, spaced forwardly and away from the axle guide slot 36 in the respective fork. The fork members 20 and 22 include a horizontal support or reference surface 44. A cam 40 is joined to each respective end 26*a* and 26*b* of the axle or shaft 26, the cams being like shaped. Each cam includes a peripheral surface 46, in the form of a spiral, that is adapted to engage the end face 42. The peripheral surface 46 is eccentric to the geometric center axis of shaft 26. When joined to their respective shaft ends, the cams and their respective eccentric peripheral surfaces 46 are symmetrically disposed, mirror images of one another, and adapted to be simultaneously rotated by the axle 26, resulting in the axle axis and both ends 26*a* and 26*b* of the axle 26 moving towards or away from the ends face in like amount, depending on the direction of rotation of the wheel axle or shaft 26.

While the method of assembly may differ, in the method as shown in FIG. 2, the cam 40 associated with the shaft end 26*a* is fixedly joined thereto, and a hexagonal nut 48 fixedly secured to the shaft end 26*a* and against the exterior cam surface 50 (i.e., facing away from the fork member). The interior face of the cam 40 is adapted to be driven against the fork member 26*a* associated therewith. The other shaft end 26*b* is provided with thread 52 for threadable connection with a securement member in the form of a hexagonal nut 54.

The cam associated with the shaft end 26*b* includes a through passage 56 of square shape that mates with a complementary cross-section 58 on the end portion 26*b* of the axle 26. This passage 56 operates to prevent rotation of the cam relative to the axle, properly orient the two cams with one another when mounted to the axle 26, and ensure that the two cams will rotate simultaneously with rotation of the driven shaft or axle 26. Threadable connection of the nut 54 to the thread 52 of the axle or shaft 26 operates to drive the cam towards the fork 22. Continued rotation and advancement of the securement hex head nut 54 causes the two cams to clampingly press against their respective forks 20 and 22. The cams, connected to the axle end portions, rotate and drive the shaft and rear sprocket rearward, set a tension and/or removes slack from the drive chain, and is locked in place in relation with the rear swing frame 18.

In setting the tension, the nut 54 is loosened and the nut 48 is rotated, causing both cams to rotate, whereupon the outer surfaces 46 press against the cam receivers or end faces 42. This cam action forces the axle 26 to move within the guide slot 36 along the horizontal plane "S" in a direction away from the end face 42, and from a first to a second position, thereby reducing the slack and increasing the tension in the reaches of the flexible drive belt. At this point, the nut 54 is torqued about the shaft end 26*b*. This torque may have a tendency to rotate the axle 26 and cause the cam at the other shaft end 26*a* to rotate and the desired tension lessened, or changed from that which was expected.

According to this invention, there is provided a socket wrench or tensioning tool, generally indicated by the number 60, for obviating the problem in tension change (e.g., decrease) during final tightening. As shown in FIGS. 3-5, the tool 60 comprises an elongated lever 62 formed from a generally planar rectangular sheet of steel to include a first end or plate portion 68 and a second end or plate portion 70 at a right angle to the plate portion 68. The right angle bend is oriented at an offset included angle θ, such as shown in FIGS. 3 and 5. The lever 62 has a shaped socket or opening 64 passing through the plate portion 68 thereof and a threaded bore 74 in the plate portion 70 thereof for receiving an externally threaded actuator rod 66. The axis of the threaded actuator rod 66 is offset from the opening 64 so that rotational movement of the actuator rod 66 effectuates rotational movement about the hex head 48, as discussed below. Therefore, the offset included angle 8 is less than ninety degrees (90°).

The socket or opening 64 is formed by a succession of V-shaped gripping surfaces 72 that are complementary to the hexagonal shape of the nuts or hex heads 48 and 54. The socket 64 allows a hex head to pass therethrough in a manner that selected of the gripping surfaces 72 are juxtaposed in close gripping relation with corresponding sidewalls of the hex head.

Desirably, the tension adjusting tool or socket wrench 60 may be used in a confined area with limited turning space, as is presented in the motorcycle herein. Preferably, the gripping surfaces 72 form a 12-point (double-hexagon) configuration, which doubles the number of starting positions which may be used to position the tool for use. Additionally, the gripping surfaces 72 may form a 6-point (hexagonal) configuration. While a hexagonal configuration or shape is preferred, the shape may be other than hexagonal.

The actuator rod 66 is axially elongated, has lower and upper end portions 66*a* and 66*b*, and an exterior surface, at least in part, provided with thread 76. The actuator rod 66 is threadably engaged with the threaded bore 74 and generally perpendicular thereto. Upon rotation, the actuator rod is axially movable relative to the lever end portion 70. A foot 78 of non-abrasive material, such as nylon, is fixedly attached to the lower end portion 66*a* of the actuator rod. A hexagonal shaped drive nut 80 is fixedly attached to the upper end portion 66*b* of the rod.

In use, and turning to FIGS. 6 and 7, the ends 26*a* and 26*b* of the driven shaft 26 are positioned in the axle slots 36 of the respective fork members 20 and 22 and the cams 40 are positioned against their respective end faces 42 of the cam guides 38, The connection is such that the cams 40 are not tightly pressing against (i.e., in clamped gripping relation) with the fork members 20 and 22.

In FIG. 6, the socket wrench 60 is positioned about the hex head 48. The hex head 48 is passed through the socket 64 of double hexagonal configuration and the lever 62 positioned such that the end portion 70 is disposed above the upwardly facing support surface 44. In the illustration shown, the gripping surfaces 72 are not shown to scale. However, in operation, the gripping surfaces 72 of the socket and sidewalls of the hexagonal shaped head 48 would form a snug engagement.

Initially, the actuator rod 66 is positioned such that the foot 78 thereof is proximate to the surface 44. A turning torque "T" is placed on the hex head 78, causing the actuator rod 66 to rotate relative to the lever 62 and the plate portion 70. The interengaging thread 76 of the rod and hex head cause the rod 66 to move vertically downwardly relative to the lever and the foot 78 to engage the support 44. So positioned, the rod axis is disposed generally perpendicular to the surface 44 and at a location "$X_1$" and the center of the shaft 26 at a location "$X_2$".

Further rotation of the rod 66 relative to the plate portion 70 causes the lever 62 to rotate upwardly, by an angle "A", the plate portion 68 causing the hex head 48 and the cam 40 to rotate. The spiral outer periphery 46 of the cam 40 engages the vertical surface 42, causing the ends 26*a* and 26*b* of the axle 26 to be driven in the slot 36 in a direction away from the face 42.

Simultaneously, and by the action of this lever action, the cam on the other side 26*b* of the shaft 26 is caused to rotate. The outer periphery of the cam on the side 26*b* rotates against the end face 42 on that side and the shaft 26, and the spiral outer periphery of the cam forces the shaft to be driven in the slot associated therewith in a direction away from the end face 42.

Rotation of the lever 62 causes shaft 26 to be horizontally driven in the slots 36 in a direction away from the face 42, and the shaft ends 26*a* and 26*b* are moved in equal amounts. The axes of the axle 26 and the rotatable sprockets 30 and 32 are maintained substantially in parallel relation to one another.

As shown in FIG. 7, the actuator rod 66 has been rotated, by an amount desired, necessary to rotate the lever 62 and move the cam and shaft to the right. So moved, the socket wrench immobilizes the driven shaft 26 in a position wherein the desired tension is established.

The rod 66 has moved to a new position "$X_3$" and the shaft has moved to a new position "$X_4$", or a distance "D". This "rightward" movement thereby sets the desired tension in the drive belt.

Thereupon, the hex head 54 is completely tightened against the cam 40, at the shaft end 26*b*, and the two cams are driven towards one another and into clamped engagement with their respective forks 20 and 22.

Thereupon, the socket wrench or tool 60 is removed from the hex head.

Note should be made that the foot 78 is comprised of a tough material, in that the material must withstand axial loads when bearing against the cam guide 38 and rotational forces occasioned by the torques placed on the rod 66. However, to obviate scratching the surface 44, the foot 78 is comprised of a material having sufficient lubricity to permit the rod 66 to translate across the surface 44 without causing scratch marks to the motorcycle exterior surface.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What we claim is:

1. In a motorcycle belt torque transmitting wrench of the type having an elongated lever including first and second end portions disposed at a right angle to one another, the right angle between the first and second end portions being offset along an offset included angle θ, θ being less than 90 degrees, the first end portion having an opening configured to receive a first nut, and the second end portion including a flange, wherein the improvement comprises:

the opening having a closed end and being generally circular in shape, the opening further having at least six gripping surfaces to engage the first nut;

a threaded actuator threadably connected to the flange for movement transverse thereto, the threaded actuator having a non-abrasive foot secured to a distal end portion of the threaded actuator for engaging a surface, and a proximal end portion of the threaded actuator having a second nut fixedly secured thereto; and the flange having a threaded hole configured to receive the threaded actuator, wherein rotational movement of the actuator rotates the wrench about the first nut.

2. The improvement according to claim 1 wherein the opening is a double-hexagonal 12-point configuration.

3. The improvement according to claim 1 wherein the foot is a nylon foot.

4. A method of adjusting and setting a desired tension in a drive belt of a motorcycle, the motorcycle including a frame having a first and second forks and associated guide brackets, a driven shaft having first and second ends, respectively, connected to the first and second forks, each end of the driven shaft having an eccentric cam that engages a respective guide bracket upon rotation of the driven shaft, the first cam having a first engagement nut fixed thereto and the second cam being connected to the second end of the driven shaft by a second engagement nut, and a drive belt operably associated, in part, in driving relation with the driven shaft, the steps of the method comprising:

providing a socket wrench, the socket wrench including an elongated lever having first and second end portions, the end portions being at right angles to one another with the first end portion including a socket and the second end portion including a threaded hole and a complementary threaded actuator extending therethrough, the threaded actuator being connected for movement relative to the lever, the actuator having an upper end portion and a lower end portion, the upper end portion having a hexagonal drive nut fixedly attached thereto, and the lower end portion having a foot fixedly attached thereto for engaging the first guide bracket wherein relative movement between the actuator and lever causes the lever to rotate about the first engagement nut;

positioning the socket about the first engagement nut and the lower end portion of the actuator atop the first guide bracket;

rotating the threaded actuator such that the lever, the first engagement nut, and the driven shaft rotate in a direction causing both cams to rotate and engage their respective guide brackets and push the driven shaft away from the guide brackets and into a position wherein the drive belt has a desired tension;

tightening the second engagement nut about the second end of the driven shaft such that the second engagement nut presses the second cam towards and against the second fork, with progressive tightening causing both of the cams to be clamped against their respective forks and the driven shaft to be locked in the position wherein the drive belt has the tension maintained, whereupon the socket wrench is removed.

5. The method of claim 4 wherein the lever comprises steel.

6. The method of claim 4 wherein the foot comprises a non-abrasive material.

7. The method of claim 4 wherein the foot comprises a nylon material.

8. The method of claim 4 wherein the first engagement nut is hexagonal in shape, and the socket is hexagonal in shape and dimensioned for close fitment about the first engagement nut.

9. The method of claim 8 wherein the socket is double-hexagonal having a 12-point configuration.

10. The method of claim 4 wherein the first and second end portions are disposed at a right angle to one another, the right angle between the first and second end portions being offset along an offset included angle θ, θ being less than 90 degrees.

* * * * *